Patented June 21, 1927.

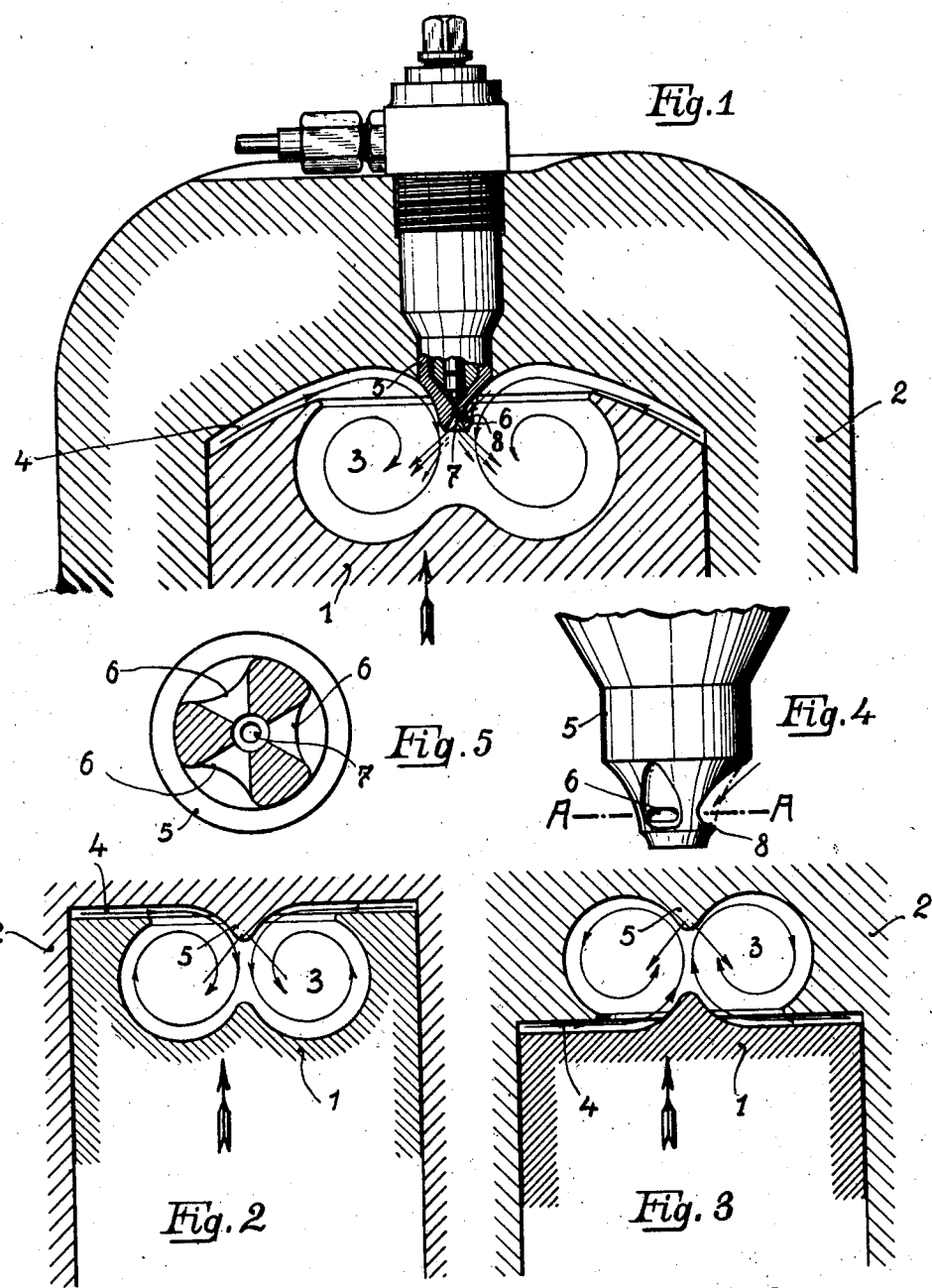

1,633,541

UNITED STATES PATENT OFFICE.

LORENZ KONRAD BRAREN, OF MUNICH, GERMANY, ASSIGNOR TO THE FIRM: FRIEDRICH DECKEL, PRAZISIONSMECHANIK UND MASCHINENBAU, OF MUNICH, BAVARIA, GERMANY.

INTERNAL-COMBUSTION ENGINE.

Application filed January 6, 1926, Serial No. 79,655, and in Germany January 14, 1925.

This invention relates to internal combustion engines of the Diesel or semi-Diesel type where the fuel is injected into the combustion chamber at or about the end of compression and has for its object a very thorough mixture of the injected fuel and the compressed air.

This object is accomplished by giving the combustion chamber the shape of a torus at the end of compression and inducing a strong current of the compressed air past the opening of the centrally located fuel injector whereby each particle of fuel issuing is taken along and always finds its share of fresh air. In order to improve the distribution of the fuel still further small apertures have been provided opening to the injecting passage from the combustion chamber whereby a quantity of the hot compressed air is drawn in injector fashion into the spray of fuel causing a better spreading and earlier ignition of the fuel. The injector is improved by the shape of these apertures opening in funnel shape against the direction of the rotating air.

The above and various other improvements will be hereinafter fully described and claimed. In order that this invention may be more readily understood reference is made to the accompanying sheet of drawings which shows how the invention may be carried into practical effect.

Fig. 1 is a section through the combustion chamber of an internal combustion engine with the piston near the upper dead center.

Figs. 2 and 3 show similar combustion chambers.

Fig. 4 is a view of the end of the fuel injector on an enlarged scale.

Fig. 5 is a cross section through the injector according to the line A—A on Figure 4.

The piston 1 is shown in the three Figures 1, 2 and 3 near the upper dead center and forms with the cylinder 2 or the cylinder cover as the case may be a torus or a space of revolution generated by a ring shaped area 3. The piston 1 still moving upwards in the direction of the arrow compresses the air in the annular outer space 4 between the cylinder head and the piston to a greater degree than in the torus 3 causing thereby a sharp current of air to flow from all sides radially inwards. The projecting point of the centrally arranged fuel injector 5 is of conical shape and deflects the in rushing air downwards where a similar point curves the current into a spiral shape as shown by the arrows in the different figures. The direction of rotation in relation to the fuel injector is reversed in the arrangement shown in Figure 3. The fuel issuing in conical shape from the injector crosses the current of air and is taken along by it thus bringing always fresh air together with each new particle of fuel. Upon reversing the movement of the piston the direction of the current is changed and the air flows radially outwards past the injector.

The injector 5 is provided with apertures 6 which connect the bore 7 of the injector with the combustion chamber in order to permit the fuel passing through this bore with great speed to draw in a certain amount of air. The bore of the injector of course is made with increasing cross section in order to improve this effect. The apertures 6 are fashioned with decreasing section to gather in a larger quantity of air. A lip 8 furthermore has been provided to catch part of the rotating air and force it through the apertures.

Having now particularly described and ascertained the nature of this my invention and in what manner the same is to be performed, I declare that what I claim is:

1. In internal combustion engines of the type where the fuel is injected at or near the end of compression a piston, a cylinder, and means for injecting fuel located centrally in the head of said cylinder, said piston and the head of said cylinder at the end of compression forming a combustion chamber of the shape of a torus surrounding said fuel injecting means and also a flat annular space surrounding said torus and extending tangentially to said torus.

2. In internal combustion engines of the type where the fuel is injected at or near the end of compression a piston, a cylinder, the face of said piston and the head of said cylinder at the end of compression forming a combustion chamber of a shape of rotation of an annular ring, with the face of said piston and the end of said cylinder head including a ring shaped flat space extending tangentially to said body of rotation, and a fuel injector located in the axis of said body of rotation.

3. In internal combustion engines of the type where the fuel is injected at or near the end of compression, a cylinder, a piston reciprocating in said cylinder, a combustion chamber between the face of said piston and the head of said cylinder of the shape of a torus, the outer annular face of said piston and of said cylinder head forming a flat ring and extending tangentially to the circumference of said torus shaped combustion chamber substantially in a radial direction, and means for injecting fuel located in the axis of said combustion chamber.

4. In internal combustion engines of the type where the fuel is injected at or near the end of compression, a cylinder, a piston reciprocating in said cylinder, a recess in the central portion of the face of said piston, said recess at the end of compression forming a torus with the head of said cylinder, the annular rest of the face of said piston at the end of compression extending tangentially to the circumference of said torus in a radial direction, and a fuel injector arranged centrally to said torus in the cover of said cylinder.

5. In internal combustion engines of the type where the fuel is injected at or near the end of compression a cylinder, a piston reciprocating in said cylinder, a combustion chamber between the face of said piston and the head of said cylinder, said combustion chamber taking on the form of a torus with the piston nearing the upper dead center, the outer annular face of said piston and said cylinder head extending tangentially to said torus shaped combustion chamber, a fuel injector located in the head of said cylinder in the axis of said torus shaped combustion chamber, and passages in said injector formed to conduct air forced from said ring shaped space into said torus into the bore of said injector this action being enhanced by the fuel passing quickly through this bore.

In testimony whereof I hereunto affix my signature.

LORENZ KONRAD BRAREN.